US011824286B2

(12) United States Patent
Xing et al.

(10) Patent No.: US 11,824,286 B2
(45) Date of Patent: *Nov. 21, 2023

(54) CONNECTION MEMBER AND RECHARGEABLE BATTERY

(71) Applicant: CONTEMPORARY AMPEREX TECHNOLOGY CO., LIMITED, Ningde (CN)

(72) Inventors: Chengyou Xing, Ningde (CN); Yulian Zheng, Ningde (CN); Taosheng Zhu, Ningde (CN); Peng Wang, Ningde (CN); Zhijun Guo, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/148,237

(22) Filed: Dec. 29, 2022

(65) Prior Publication Data

US 2023/0140187 A1 May 4, 2023

Related U.S. Application Data

(63) Continuation of application No. 16/962,527, filed as application No. PCT/CN2018/080679 on Mar. 27, 2018, now Pat. No. 11,581,615.

(30) Foreign Application Priority Data

Jan. 16, 2018 (CN) .......................... 201820067943.X

(51) Int. Cl.
*H01R 11/05* (2006.01)
*H01M 50/531* (2021.01)
(Continued)

(52) U.S. Cl.
CPC ............ *H01R 11/05* (2013.01); *H01M 50/50* (2021.01); *H01M 50/531* (2021.01); *H01R 25/161* (2013.01)

(58) Field of Classification Search
CPC ...... H01R 11/05; H01R 25/16; H01R 25/161; H01M 50/531; H01M 50/533; H01M 50/534; H01M 50/536
See application file for complete search history.

(56) References Cited

U.S. PATENT DOCUMENTS 9,287,550 B2    3/2016  Kim et al.
10,826,047 B2   11/2020 Guo et al.
(Continued)

FOREIGN PATENT DOCUMENTS

CN   101521265 A   9/2009
CN   102969477 A   3/2013
(Continued)

OTHER PUBLICATIONS

The World Intellectual Property Organization (WIPO) Written Opinion for PCT/CN2018/080679 dated Sep. 28, 2018 7 pages (including translation).
(Continued)

*Primary Examiner* — Oscar C Jimenez
*Assistant Examiner* — Paul D Baillargeon
(74) *Attorney, Agent, or Firm* — ANOVA LAW GROUP, PLLC

(57) ABSTRACT

A rechargeable battery includes a battery core and a connection member. The connection member includes a guide plate and a first connecting plate integrally formed on the guide plate and connected to a tab of the battery core. The first connecting plate is disposed in a bendable manner relative to the guide plate, and at least one indentation is present between the first connecting plate and the guide
(Continued)

plate. The tab extends from a side of a core body of the battery core in a width direction. At least a portion of the guide plate protrudes, relative to the first connecting plate, towards the core body of the battery core to form a protrusion, and the protrusion abuts against the battery core.

19 Claims, 16 Drawing Sheets

(51) Int. Cl.
*H01M 50/50* (2021.01)
*H01R 25/16* (2006.01)

(56) References Cited

U.S. PATENT DOCUMENTS

| | | | |
|---|---|---|---|
| 11,581,615 B2* | 2/2023 | Xing | .............. H01M 50/533 |
| 2013/0330593 A1 | 12/2013 | Kim et al. | |
| 2017/0170445 A1 | 6/2017 | Kim et al. | |
| 2023/0136854 A1* | 5/2023 | Xing | ................ H01R 11/05 |
| | | | 429/211 |
| 2023/0138054 A1* | 5/2023 | Xing | ............. H01M 10/052 |
| | | | 429/211 |
| 2023/0140187 A1 | 5/2023 | Xing et al. | |

FOREIGN PATENT DOCUMENTS

| | | |
|---|---|---|
| CN | 203377303 U | 1/2014 |
| CN | 105845851 A | 8/2016 |
| CN | 206806417 U | 12/2017 |
| EP | 2618403 A1 | 7/2013 |
| EP | 3451417 A1 | 3/2019 |
| EP | 3512005 A1 | 7/2019 |
| JP | 2003217557 A | 7/2003 |
| WO | WO-2013076831 A1 * 5/2013 ........ H01M 10/0431 |
| WO | 2015133224 A1 | 9/2015 |

OTHER PUBLICATIONS

The China National Intellectual Property Administration (CHIPA) Notice of Granting Priority Right of Utility Model Patent Right for Chinese Application 201820067943.X dated Sep. 5, 2018 1 Page.
Machine Translation WO 2015133224 A1.
Extended European Search Report dated Mar. 5, 2021, including the Supplementary European Search Report and the European Search Opinion, in connection with corresponding EP Application No. 18901342.8 (7 pp.).
International Search Report dated Sep. 28, 2018 in corresponding International application No. PCT/CN2018/08069; 6 pages.
The European Patent Office (EPO) Intention to Grant for EP Application No. 18901342.8 dated Jan. 26, 2023 5 Pages.
The United States Patent and Trademark Office (USPTO) The Office Action for 18148184 dated Jun. 23, 2023 19 Pages.
The United States Patent and Trademark Office (USPTO) The Office Action for 18148260 Jun. 23, 2023 16 Pages.

* cited by examiner

CONNECTION MEMBER AND RECHARGEABLE BATTERY

CROSS-REFERENCE TO RELATED APPLICATIONS

This application is a continuation of application Ser. No. 16/962,527, filed on Jul. 16, 2020, which is National Stage of International Application No. PCT/CN2018/080679, filed on Mar. 27, 2018, which claims priority to Chinese Patent Application No. 201820067943.X entitled "CONNECTION MEMBER AND RECHARGEABLE BATTERY" and filed on Jan. 16, 2018, the entire contents of all of which are incorporated herein by reference.

TECHNICAL FIELD

This application relates to the technical field of batteries, and in particular to a connection member and a rechargeable battery.

BACKGROUND

With development of science and technology, increasingly high requirements are imposed on rechargeable batteries. Lithium-ion batteries are used as an example. With advantages of high energy density, high power density, a long cycle life, and a long endurance time, the lithium-ion batteries are widely used in portable electronic devices such as mobile phones, digital cameras, and laptop computers, and are growing in popularity with electric transport such as electric vehicles and electric bicycles, and large and medium electric devices such as energy storage facilities, becoming an important technical means to resolve global problems such as energy crisis and environmental pollution. Electric vehicles and other devices that need to use rechargeable batteries impose higher requirements on energy density and safety performance of the rechargeable batteries.

In a prior-art square rechargeable battery, a tab of a battery core is connected to a connection member. A first connecting plate, connected to the tab, of the connection member is typically parallel to a longitudinal direction of the battery core. With growing demand on large-current batteries in the market, to meet a requirement of protecting against temperature rise resulting from battery overcurrent, a sufficient welding area needs to be provided between the first connecting plate and the tab, and the battery core needs to be large enough in a longitudinal direction, thereby occupying more space. This results in low space utilization and low energy density of the battery core.

SUMMARY

An objective of this application is to provide a connection member and a rechargeable battery, aiming to improve accuracy of a bending position of the connection member, so as to avoid an adverse effect on a size of the connection member being bent.

A first aspect of this application provides a connection member of a rechargeable battery, including a guide plate and a first connecting plate integrally formed on the guide plate, the first connecting plate is disposed in a bendable manner relative to the guide plate, and at least one indentation is present between the first connecting plate and the guide plate.

In some embodiments, the connection member includes the at least one indentation provided on a side, of the connection member, to which pressure is applied when the first connecting plate is bent relative to the guide plate.

In some embodiments, all the indentations of the connection member are provided on the side, of the connection member, to which pressure is applied when the first connecting plate is bent relative to the guide plate.

In some embodiments, the guide plate includes a main plate body and a flanged portion, where the flanged portion is arranged at a side edge of the main plate body in a width direction, the first connecting plate is connected to the guide plate through the flanged portion, and a distance between the at least one indentation and the main plate body is 1 to 3 times a thickness of the main plate body.

In some embodiments, a cross-sectional shape of the at least one indentation is one of a curve, a polygonal line and a combination of a curve and a straight line.

In some embodiments, an opening of the at least one indentation is larger than a bottom of the at least one indentation before the first connecting plate is bent relative to the guide plate.

In some embodiments, a depth of the at least one indentation is $1/4$ to $1/3$ of a minimum plate thickness at a position of the at least one indentation when the at least one indentation is not provided.

In some embodiments, the at least one indentation is provided continuously along a full or partial length of the bending position between the first connecting plate and the guide plate; or the at least one indentation includes a plurality of indentation segments provided intermittently along the full or partial length of the bending position between the first connecting plate and the guide plate.

In some embodiments, ends of a bending position between the first connecting plate and the guide plate include a first root and a second root that are respectively arranged at opposite ends of the bending position, the connection member includes a first groove arranged at the first root and disposed on the first connecting plate and the guide plate, and the first groove is recessed downward from an upper edge of the bending position.

In some embodiments, the connection member further includes a second groove arranged at the second root and disposed on the first connecting plate and the guide plate, and the second groove is recessed upward from a lower edge of the bending position.

In some embodiments, a thickness of the first connecting plate is set to be smaller than a thickness of the guide plate.

In some embodiments, a portion, of the guide plate, connected to the first connecting plate becomes gradually thinner in the direction from the guide plate to the first connecting plate.

A second aspect of this application provides a rechargeable battery, including a battery core and the connection member according to any one of the first aspect of this application, where a first connecting plate is connected to a tab of the battery core.

In some embodiments, the tab extends from a side of a core body in a width direction; the guide plate extends along the width direction, and the first connecting plate extends to an outer side of the guide plate along the width direction, at least a portion of the guide plate protrudes, relative to the first connecting plate, towards the body of the battery core to form a protrusion, and the protrusion abuts against the battery core.

In some embodiments, the rechargeable battery further includes a gasket that is fastened to the first connecting plate and the tab, and the tab is sandwiched between the first connecting plate and the gasket.

According to the connection member and the rechargeable battery provided in this application, the at least one indentation is provided to form a thin part at the at least one indentation between the first connecting plate and the guide plate, so that the bending position is more accurate when the first connecting plate is bent relative to the guide plate. This is conducive to an accurate size of the connection member being bent, and is also helpful for the rechargeable battery to successfully assemble the battery core, the connection member, and a housing. Moreover, the at least one indentation makes bending of the first connecting plate more labor-saving, thereby reducing possible damage caused by bending to the battery core and a tab of the battery core.

The rechargeable battery of this application includes the foregoing connection member, and therefore has the same advantages as the connection member.

Other features and advantages of this application become clear by describing in detail exemplary embodiments of this application with reference to the following accompanying drawings.

BRIEF DESCRIPTION OF DRAWINGS

The accompanying drawings described herein are intended to provide a further understanding of this application and constitute a part of this application. The exemplary embodiments of this application and the descriptions thereof are intended to explain this application and do not constitute an inappropriate limitation on this application. In the drawings.

DESCRIPTION OF EMBODIMENTS

Figure 1:
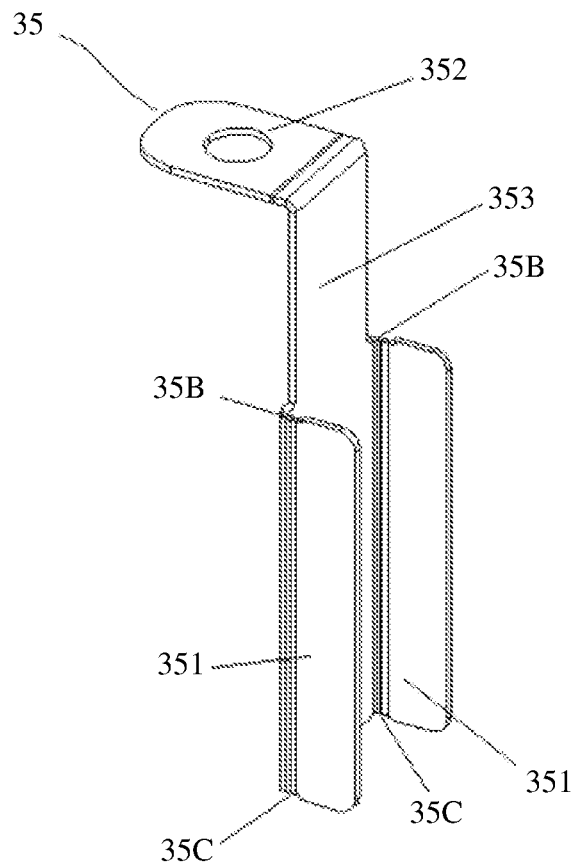
FIG. 1 is a schematic structural diagram of a connection member of a rechargeable battery before a first connecting plate is bent relative to a guide plate according to an embodiment of this application.
Figure 2:
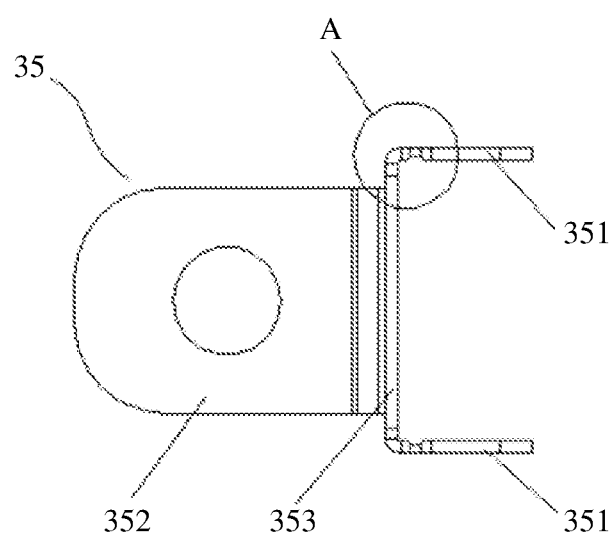
FIG. 2 is a schematic upward view of FIG. 1.

The following clearly and completely describes the technical solutions in the embodiments of this application with reference to the accompanying drawings in the embodiments of this application. Apparently, the described embodiments are merely some rather than all of the embodiments of this application. The following description of at least one exemplary embodiment is actually merely illustrative and is not intended to constitute any limitation on this application and its application or use. All other embodiments obtained by persons of ordinary skill in the art based on the embodiments of this application without creative efforts shall fall within the protection scope of this application.

Unless otherwise specified, the relative arrangements, numeric expressions, and values of the components and steps described in these embodiments do not limit the scope of this application. It should also be understood that, for ease of description, the dimensions of the parts shown in the accompanying drawings are not drawn based on actual proportionality. The technologies, methods, and devices known to those of ordinary skill in the relevant fields may not be discussed in detail, but, where appropriate, should be considered as a part of the authorized specification. In all the examples shown and discussed herein, any specific value should be interpreted as merely an example, not as a limitation. Therefore, different values may be used in other examples of exemplary embodiments. It should be noted that similar reference numerals and letters denote similar terms in the following accompanying drawings, so that once a particular term is defined in one of the accompanying drawings, no further discussion is required in the subsequent accompanying drawings.

In the description of this application, it should be understood that the use of the terms such as "first" and "second" for limiting parts is merely intended to facilitate distinguishing between corresponding parts. Unless otherwise stated, the foregoing terms have no special meaning, and therefore cannot be construed as a limitation on the protection scope of this application.

In the description of this application, it should be understood that the orientation or position relationships indicated by the orientation words such as "front, back, up, down, left, right", "transverse, lengthwise, vertical, horizontal", and "top, bottom" are usually based on the orientation or position relationships shown in the accompanying drawings, and are merely intended to facilitate the description of this application and make the description easy. In absence of opposite description, these orientation words do not indicate and imply that the corresponding apparatus or element must have a given orientation or be constructed and operated in a given orientation, and therefore should not be construed as a limitation on the protection scope of this application. The orientation words "inside, outside" refer to the inner side and outer side of a profile of each part.

To increase space utilization of the battery core, the first connecting plate is typically bent. During implementation of this application, designers found that, in a process of bending the first connecting plate, an inaccurate bending position may affect a size of a bent connection member 35, which is not helpful for the rechargeable battery to successfully assemble a battery core 100, the connection member 35, and a housing.

Figure 7:
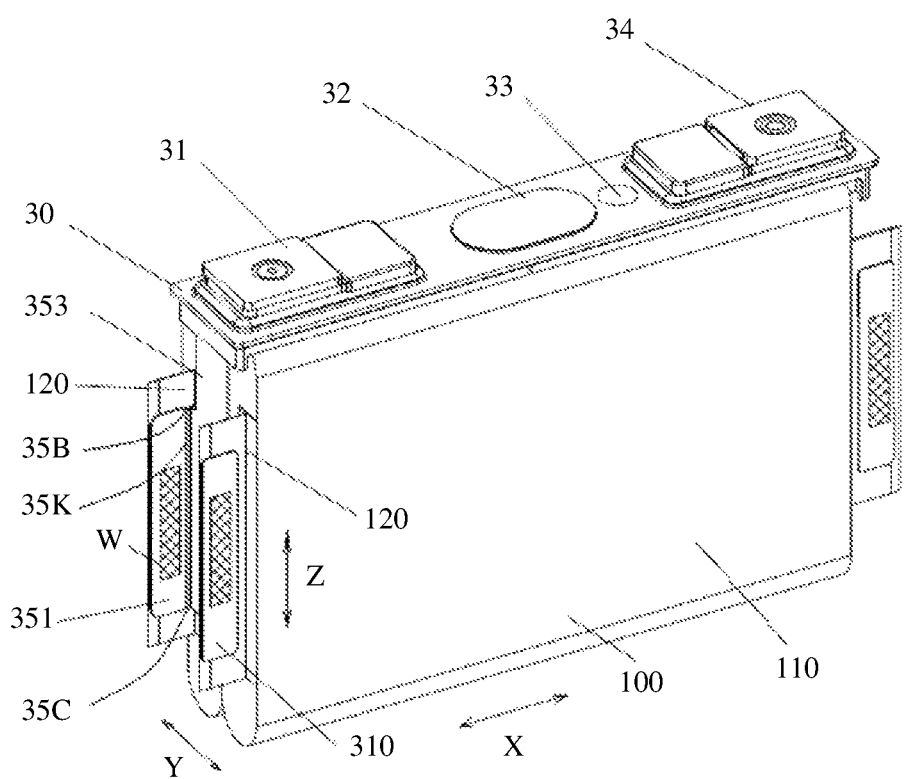
FIG. 7 is a schematic three-dimensional structural diagram of a rechargeable battery after a housing is disassembled according to an embodiment of this application, where a first connecting plate has been connected to a tab but has not been bent yet.
Figure 19:
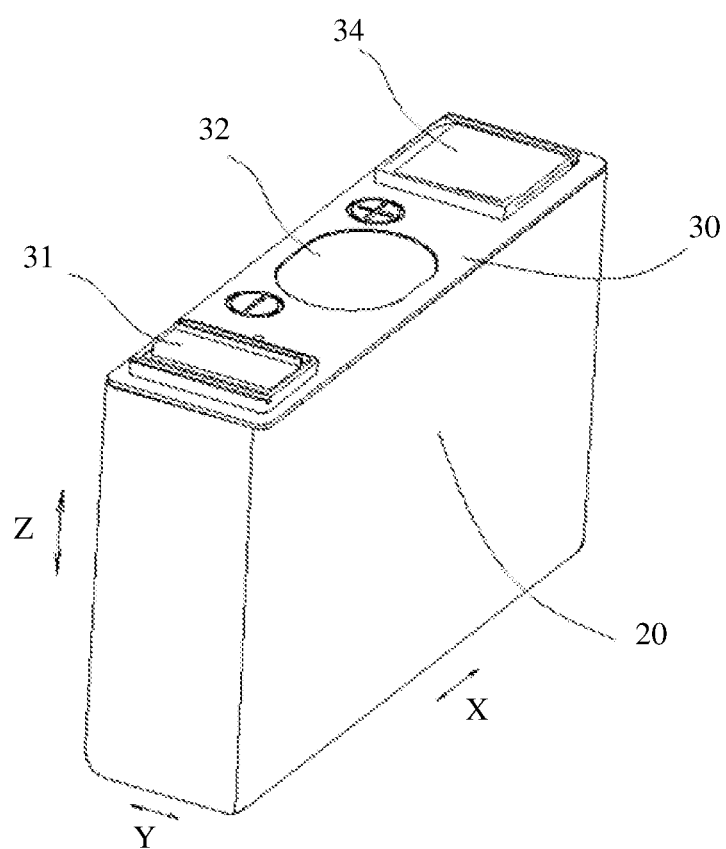
FIG. 19 is a schematic three-dimensional structural diagram of a rechargeable battery according to an embodiment of this application.
Figure 20:
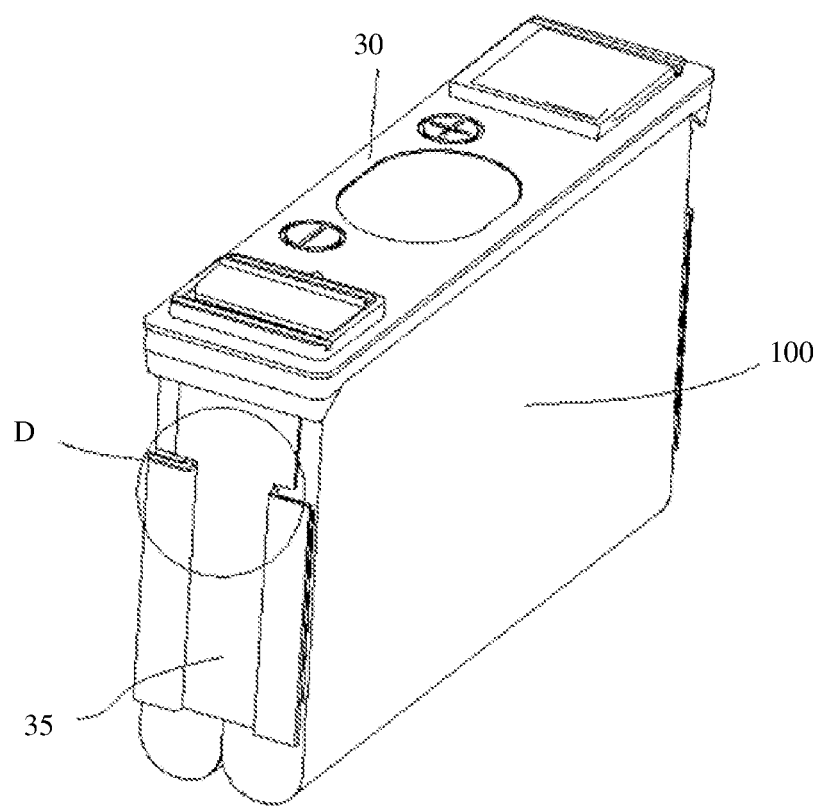
FIG. 20 is a schematic three-dimensional structural diagram of a rechargeable battery after a housing is disassembled according to the embodiment shown in FIG. 19.
Figure 21:
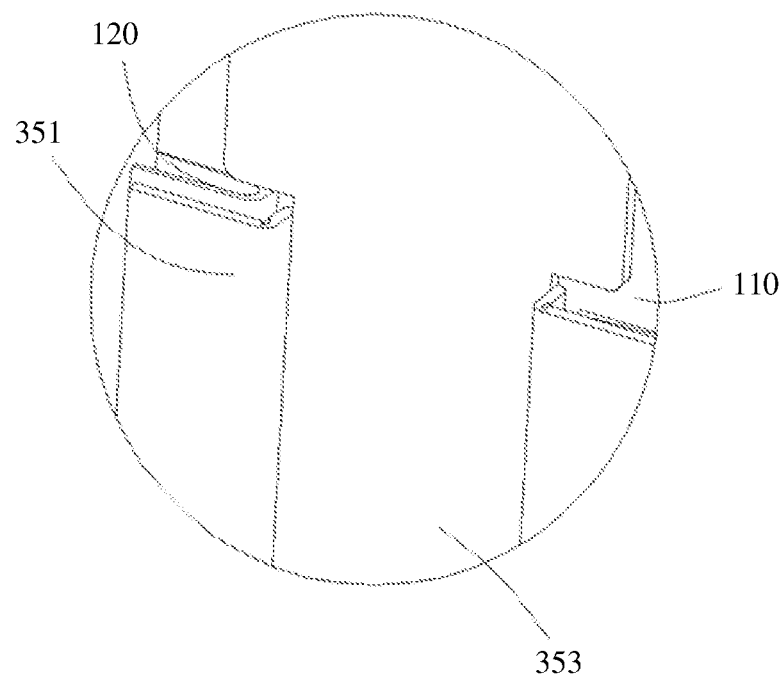
FIG. 21 is a schematic enlarged structural diagram of part D of FIG. 20.
Figure 22:
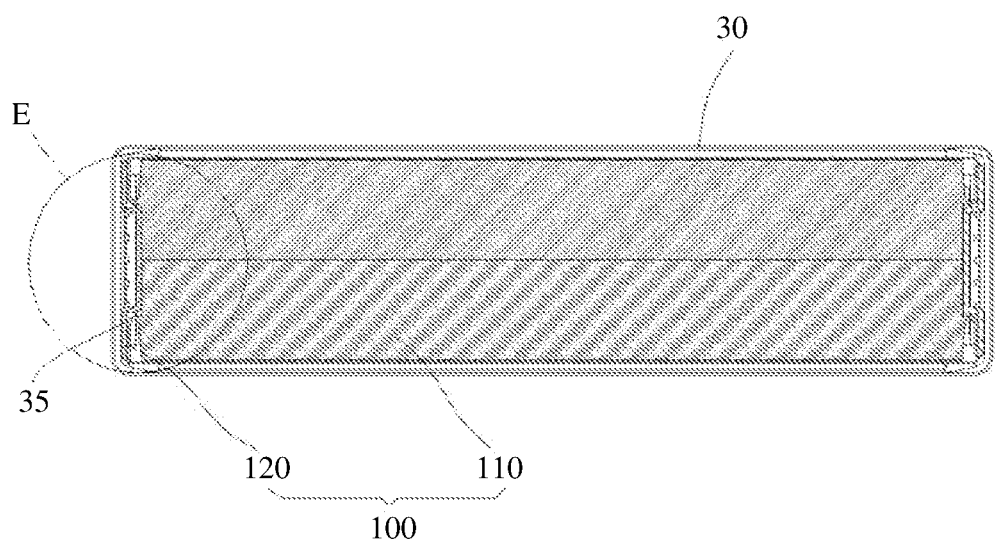
FIG. 22 is a schematic cross-sectional structural diagram of an upward view of the rechargeable battery according to the embodiment shown in FIG. 20.

In the description of this application, a "longitudinal direction" is a longitudinal direction of a rechargeable battery and also a longitudinal direction of a battery core, corresponding to a direction X in FIG. 7 and FIG. 19. A "width direction" is a width direction of the rechargeable battery, corresponding to a direction Y in FIG. 7 and FIG. 19. The "width direction" is also a width direction of a connection member and a guide plate of the connection member. A "height direction" is a direction perpendicular to the longitudinal direction and the width direction, corresponding to a direction Z in FIG. 7 and FIG. 19. The "height direction" is a height direction of the rechargeable battery and the battery core, and also a height direction of the connection member and the guide plate of the connection member.

FIG. 1 to FIG. 23 show structures of the rechargeable battery and parts thereof according to the embodiments of this application.

The embodiments of this application provide a connection member 35 of a rechargeable battery. The connection member 35 includes a guide plate 353 and a first connecting plate 351 integrally formed on the guide plate 353. The first connecting plate 351 is disposed in a bendable manner relative to the guide plate 353. At least one indentation 35K is present between the first connecting plate 351 and the guide plate 353.

The at least one indentation 35K is provided to form a thin part at the at least one indentation 35K between the first connecting plate 351 and the guide plate 353, so that the bending position is more accurate when the first connecting plate 351 is bent relative to the guide plate 353. This is conducive to an accurate size of the connection member 35 being bent, and is also helpful for the rechargeable battery to successfully assemble the battery core 100, the connection member 35, and a housing. Moreover, the at least one indentation 35K makes bending of the first connecting plate 351 more labor-saving, thereby reducing possible damage caused by bending to the battery core 100 and a tab 120 of the battery core.

The rechargeable battery in the embodiments of this application includes the foregoing connection member, and therefore has the same advantages as the connection member.

With reference to FIG. 1 to FIG. 23, the rechargeable battery and the connection member according to the embodiments of this application are described in more detail below.

The connection member 35 is configured to electrically connect a battery core 100 of a rechargeable battery to outside of the rechargeable battery. As shown in FIG. 1 to FIG. 6, the connection member 35 includes the guide plate 353, the first connecting plate 351 connected to at a side edge of the guide plate 353 in a width direction, and a second connecting plate 352 connected to the guide plate 353 and configured to electrically connect to the outside of the rechargeable battery. The first connecting plate 351 is configured to connect to the battery core 100. The second connecting plate 352 is configured to electrically connect to the outside of rechargeable battery. The at least one indentation 35K is present between the first connecting plate 351 and the guide plate 353 that are of the connection member 35.

The at least one indentation 35K is provided to form a thin part at the at least one indentation 35K between the first connecting plate 351 and the guide plate 353, so that a bending position is more accurate when the first connecting plate 351 is bent relative to the guide plate 353. This is conducive to an accurate size of the connection member 35 being bent, and is also helpful for the rechargeable battery to successfully assemble the battery core 100, the connection member 35, and a housing. Moreover, the at least one indentation 35K makes bending of the first connecting plate 351 more labor-saving, thereby reducing possible damage caused by bending to the battery core 100 and a tab 120 of the battery core.

Figure 15:
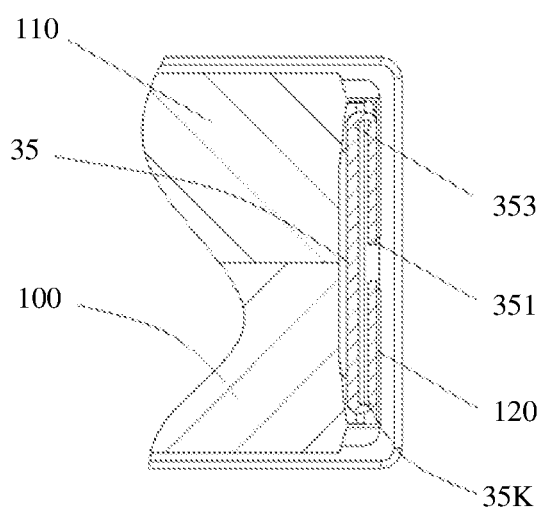
FIG. 15 is a schematic partially-enlarged structural diagram of an upward view of the rechargeable battery according to the embodiment shown in FIG. 14.
Figure 23:
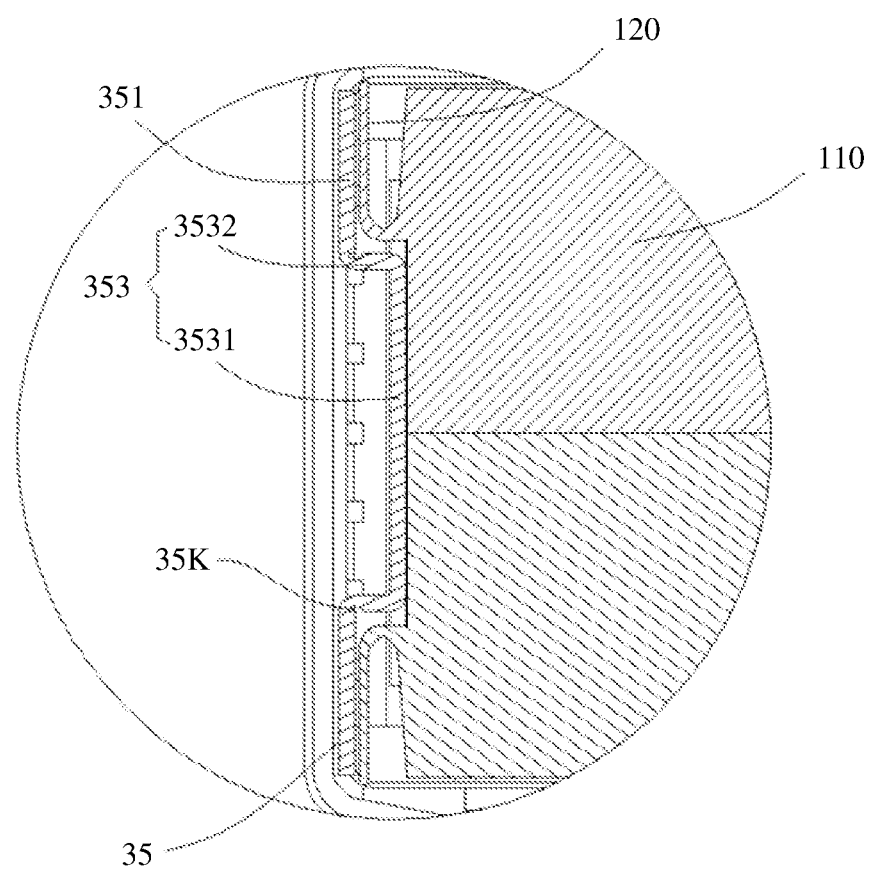
FIG. 23 is a schematic enlarged structural diagram of part E of FIG. 22.

In this embodiment, in an implementation, the connection member 35 includes the at least one indentation 35K provided on a side, of the connection member 35, to which pressure is applied when the first connecting plate 351 is bent relative to the guide plate 353. Specifically, as shown in FIG. 15, when the first connecting plate 351 is bent inwards relative to the guide plate 353, the at least one indentation 35K is provided on an inner side of the connection member 35 because pressure is applied to the inner side of the connection member 35. As shown in FIG. 23, when the first connecting plate 351 is bent outwards relative to the guide plate 353, the at least one indentation 35K is provided on an outer side of the connection member 35 because pressure is applied to the outer side of the connection member 35. Further, in an implementation, all the indentations 35K of the connection member 35 are provided on the side, of the connection member 35, to which pressure is applied when the first connecting plate 351 is bent relative to the guide plate 353. In this embodiment, the at least one indentation 35K is provided on the side, of the connection member 35, to which pressure is applied when the first connecting plate 351 is bent relative to the guide plate 353, so that there is no tensile stress at the at least one indentation when the first connecting plate 351 is bent. In this way, a probability of breakage of the connection member 35 during bending is decreased compared with a case in which the at least one indentation is provided on a side (corresponding to the outer side of the connection member 35 in FIG. 15 or corresponding to the inner side of the connection member 35 in FIG. 23), of the connection member 35, to which a tensile force is applied when the first connecting plate 351 is bent relative to the guide plate 353.

Figure 3:
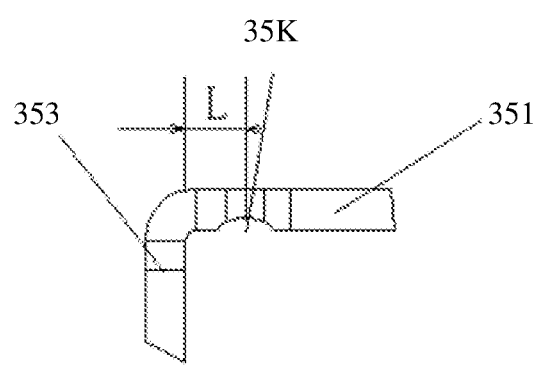
FIG. 3 is a schematic enlarged structural diagram of part A of FIG. 2.
Figure 6:
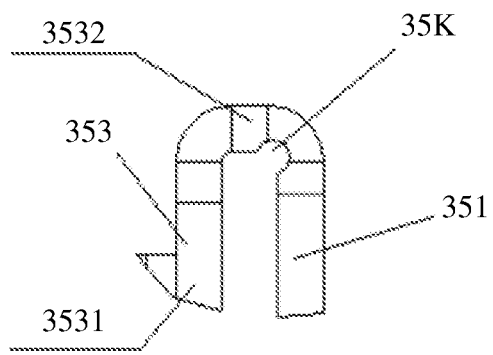
FIG. 6 is a schematic enlarged structural diagram of part B of FIG. 5.

To implement effective bending of the connection member 35 and effectively control a spatial size of the connection member 35 being bent, in an implementation, as shown in FIG. 6, the guide plate 353 includes a main plate body 3531 and a flanged portion 3532. The flanged portion 3532 is arranged on a side edge of the main plate body 3531 in a width direction Y. The first connecting plate 351 is connected to the guide plate 353 through the flanged portion 3532. A distance L between the at least one indentation 35K and the main plate body 3531 of the guide plate 353 is 1 to 3 times a thickness of the main plate body. As shown in FIG. 3, the distance L is a distance between a deepest position (for example, an arc bottom of the at least one indentation whose cross-section is arc-shaped) of the at least one indentation 35K or a mid-surface (for example, a mid-surface that is of a bottom of the at least one indentation with a trapezoidal cross-section and that is parallel to the main plate body 3531) of the main plate body 3531 parallel to the deepest position and a surface, of the main plate body 3531, closer to the at least one indentation 35K when the first connecting plate 351 is not bent relative to the guide plate 353.

In some embodiments, a depth of the at least one indentation 35K is ¼ to ⅓ of a minimum plate thickness at a position of the at least one indentation 35K when the at least one indentation is not provided. When a size of the at least one indentation 35K is properly set, an accurate bending position can be obtained, to ensure a connection strength between the first connecting plate 351 and the guide plate 353 and prevent an excessively deep indentation from affecting a current flow capacity of the connection member 35 at the at least one indentation 35K.

As shown in FIG. 1, in this embodiment, the at least one indentation 35K is provided continuously along a full length of the bending position between the first connecting plate 351 and the guide plate 353. In some embodiments not shown in the figures, the at least one indentation may also be provided continuously along a partial length of the bending position between the first connecting plate and the guide plate. In some other embodiments not shown in the figures, the at least one indentation 35K includes a plurality of indentation segments provided intermittently along the full or partial length of the bending position between the first connecting plate and the guide plate.

The at least one indentation 35K may be in a variety of cross-sectional shapes. The cross-sectional shape of the at least one indentation 35K may be a curve or a polygonal line or a combination of a curve and a straight line. For example, the cross-sectional shape of the at least one indentation 35K may be an arc shown in FIG. 3, or a trapezoid shown in FIG. 9, or a triangle shown in FIG. 10. The indentations 35K in different shapes have different advantages. For example, the indentation with the arc-shaped cross-section can effectively prevent or alleviate stress concentration. The indentation with the trapezoid-shaped cross-section has a relatively shallow depth, making it easy to ensure the current flow capacity from the first connecting plate 351 to the guide plate 353. The indentation with the triangular cross-section is easier to process, and a position of the first connecting plate 351 being bent can be relatively more accurate.

In some embodiments, an opening of the at least one indentation 35K is larger than a bottom of the at least one indentation 35K before the first connecting plate 351 is bent relative to the guide plate 353. For example, for each type of indentation shown in FIG. 3, FIG. 9, or FIG. 10, the opening of the at least one indentation forms an elongated opening, the bottom is either a straight line (a bottom of the arc-shaped cross-section shown in FIG. 3, and a bottom of the trapezoid-shaped cross-section shown in FIG. 10) or an elongated bottom smaller than the elongated opening (for example, a bottom of the trapezoid-shaped cross-section shown in FIG. 9). The opening of the at least one indentation 35K is larger than the bottom of the at least one indentation 35K, thereby ensuring the bending position of the first connecting plate 351 and easy processing of the at least one indentation 35K. Furthermore, in the case in which the at least one indentation 35K is provided on a side, of the connection member 35, to which pressure is applied when the first connecting plate 351 is bent relative to the guide plate 353, the opening of the at least one indentation 35K can be protected against pressing or less pressing during the bending of the first connecting plate, so that the first connecting plate 351 can be more easily bent in place.

In addition, in an implementation, ends of the bending position between the first connecting plate 351 and the guide plate 353 include a first root and a second root that are respectively arranged at opposite ends of the bending position. The connection member 35 includes a first groove 35B arranged at the first root and disposed on the first connecting plate 351 and the guide plate 353 and a second groove 35C arranged at the second root and disposed on the first connecting plate 351 and the guide plate 353.

Figure 4:
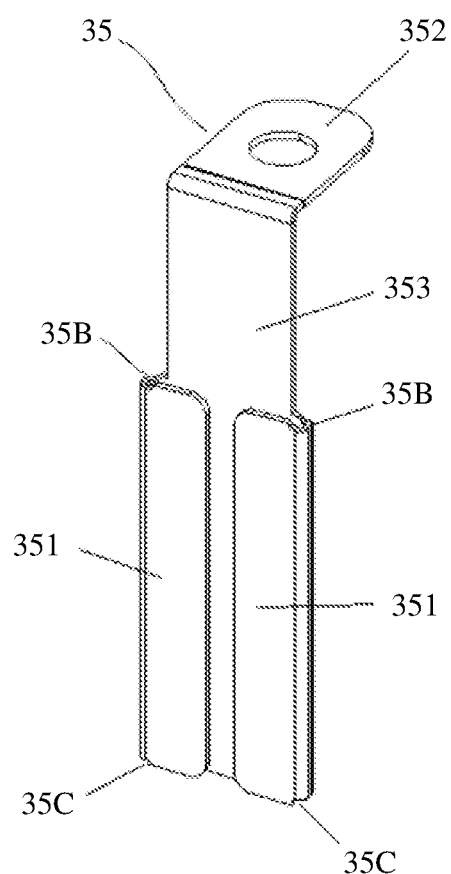
FIG. 4 is a schematic three-dimensional structural diagram of the connection member of the rechargeable battery shown in FIG. 1 after a first connecting plate is bent relative to a guide plate.
Figure 5:
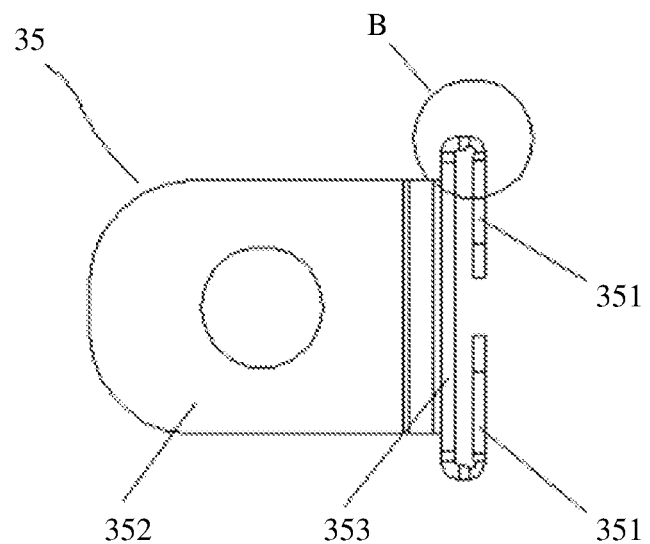
FIG. 5 is a schematic upward view of FIG. 4.

As shown in FIG. 1 to FIG. 6, in the connection member 35 of this embodiment, the two first connecting plates 351 are respectively disposed on two side edges of the guide plate 353 in the width direction Y. The first groove 35B is arranged at the first root of the bending position, to be specific, at the tops of FIG. 1 and FIG. 4. The second groove 35C is arranged at the second root opposite to the first root of the bending position, to be specific, at the bottoms of FIG. 1 and FIG. 4. As shown in FIG. 1 and FIG. 4, the bending position extends along a height direction Z of the connection member 35, the first groove 35B is recessed downward from an upper edge of the bending position, and the second groove 35C is recessed upward from a lower edge of the bending position.

Providing the first groove 35B and the second groove 35C can protect the connection member 35 against damage to the ends of the bending position during bending, and effectively alleviate a crack problem of the ends occurred during bending for the connection member 35.

In some embodiments, the first groove 35B and the second groove 35C may be smoothly connected to the first connecting plate 351 and the guide plate 353.

In addition, in an implementation, a cross-section of the groove is a smooth curved section or a smoothly connected multi-section line. For example, the first groove 35B or the second groove 35C may be a square groove connected through a circular arc at the corner.

In other embodiments not shown in the figures, the groove may alternatively be a U-shaped groove, an arc-shaped groove, or the like. A cross-section shape of the arc-shaped groove may be, for example, a semicircular or a major arc.

With the foregoing disposition, no stress is concentrated at the ends of the bending position and/or near the ends of the bending position, which helps protect the connection member 35 against partial crack caused by bending of the first connecting plate 351.

Figure 8:
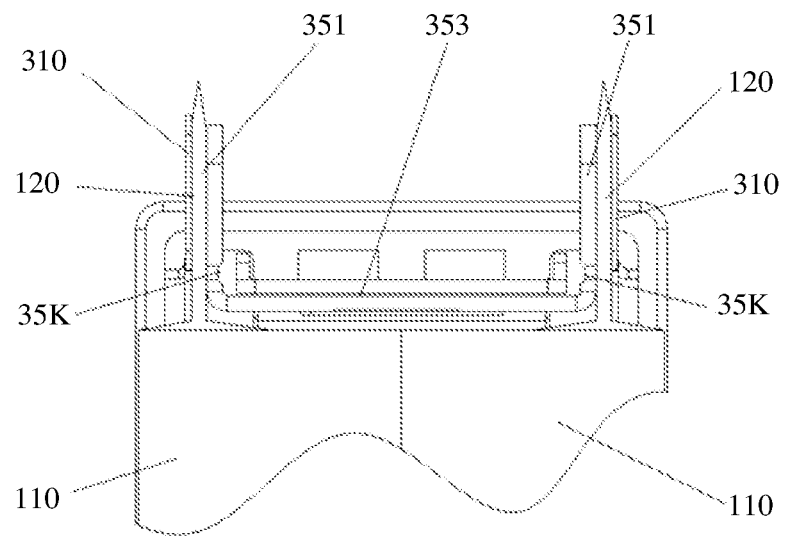
FIG. 8 is a schematic partially-enlarged structural diagram of an upward view of the rechargeable battery according to the embodiment shown in FIG. 7.
Figure 9:
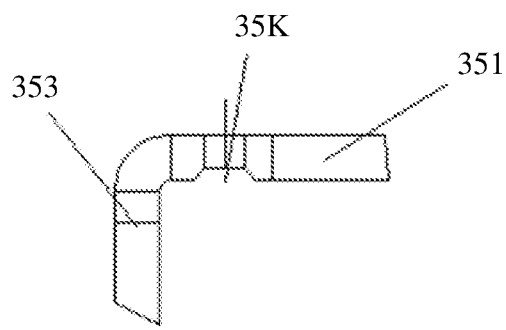
FIG. 9 is a schematic diagram of a partial structure of an alternative embodiment of the connection member shown in FIG. 1.
Figure 10:
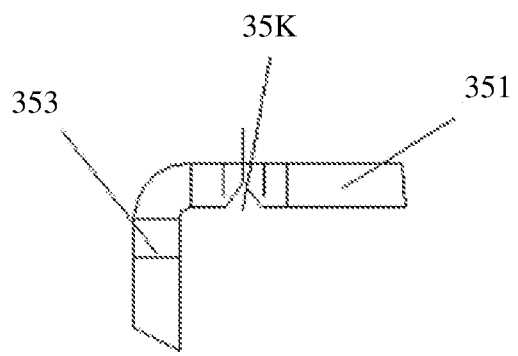
FIG. 10 is a schematic diagram of a partial structure of another alternative embodiment of the connection member shown in FIG. 1.

As shown in FIG. 7 and FIG. 8, in the rechargeable battery according to some embodiments of this application, the rechargeable battery mainly includes a housing, a top cover 30, a battery core 100, and a connection member 35. The housing is not shown in the figures. A longitudinal direction of the battery core 100 is consistent with a longitudinal direction X; a thickness direction of the battery core 100 is consistent with a width direction Y; and a height direction of the battery core 100 is consistent with a height direction Z.

The top cover 30 has an explosion-proof valve 32, an injection hole 33, a positive electrode component 31, and a negative electrode component 34. In FIG. 7, W represents a welding position between the first connecting plate 351 and a tab 120.

The housing and the top cover 30 form an installation space. The battery core 100, the guide plate 353 of the connection member 35, and a portion of the first connecting plate 351 below the top cover 30 are arranged within the installation space. The second connecting plate 352 of the connection member 35 is connected to the electrode components on the top cover 30. In FIG. 7, a connection hole is provided in the second connecting plate 352, and the second connecting plate 352 is connected to the electrode component through the connection hole.

As shown in FIG. 7, the electrode component on the top cover 30 includes: the positive electrode component 31 configured to electrically connect to a positive electrode of the battery core 100, and the negative electrode component 34 configured to electrically connect to a negative electrode of the battery core 100. The explosion-proof valve 32 is further disposed on the top cover 30. Another structure such the injection hole 33 may be further provided in the top cover 30.

The connection member 35 of the rechargeable battery may be first fastened to the top cover 30 and the electrode component on the top cover 30, and then connected to the battery core 100. During connection of the connection member 35 and the battery core 100, after a position of the guide plate 353 relative to the core body 110 is determined, the first connecting plate 351 is fastened to the tab 120 at an angle with respect to an end surface of the core body 110; then the first connecting plate 351 is bent to an assembly position, for example, the first connecting plate 351 in this embodiment is bent to be parallel to the end surface of the core body 110. After assembly of the connection member 35 and the battery core 100 is complete, the connection member 35 and the battery core 100 are placed into the housing together. After assembly of the connection member 35 and the battery core 100 is complete, the top cover 30 is placed over an opening of the housing, and then the top cover 30 is sealed to the housing.

Figure 11:
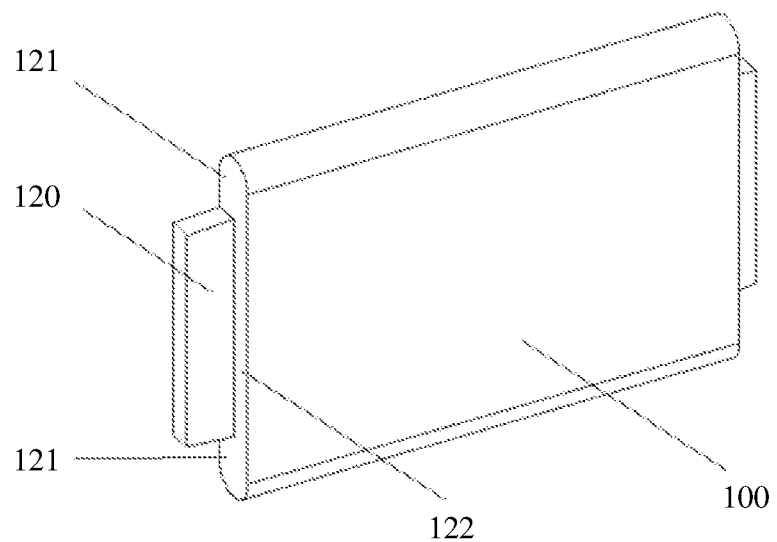
FIG. 11 is a schematic structural diagram of a battery core of a rechargeable battery according to an embodiment of this application.
Figure 12:
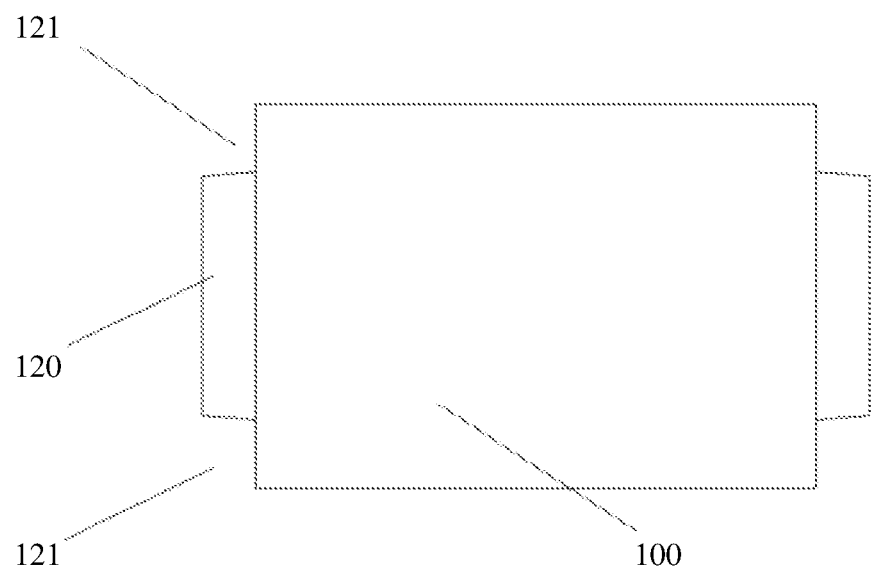
FIG. 12 is a front view of the battery core shown in FIG. 11.
Figure 13:
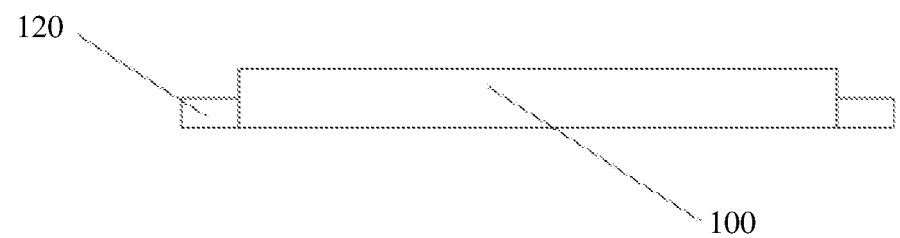
FIG. 13 is an upward view of the battery core shown in FIG. 11.

As shown in FIG. 11 to FIG. 13, a battery core 100 includes a core body 110 and a tab 120 extending from the core body 110.

The battery core 100 is a square core formed by stacking and winding a positive plate, a separator, and a negative plate. A width direction of the positive plate, the separator, and the negative plate forms a longitudinal direction of the battery core 100.

The positive plate and negative plate each include a substrate and an active substance coated on the substrate. An area coated with the active substance on the substrate forms a coated area. The separator is used to separate the positive plate from the negative plate, to avoid short circuits inside the rechargeable battery. The substrate of the positive plate may be a first metal foil, for example, an aluminum foil. The substrate of the negative plate may be a second metal foil, for example, a copper foil.

The tab 120 includes a positive tab and a negative tab. The positive tab is formed by a portion, of the first metal foil, not coated with an active substance on one side edge. The negative tab is formed by a portion, of the second metal foil, not coated with an active substance on one side edge. In this embodiment, the positive tab and the negative tab are arranged at two ends of the battery core 100 in the longitudinal direction and protrude beyond the corresponding ends of the separator.

As shown in FIG. 11 to FIG. 13, in the battery core 100 of this embodiment, the tab 120 extends from a side of the core body 110 in the thickness direction. As shown in FIG. 11, the tab 120 extends from a rear side of the core body 110 in the thickness direction, but not extending from a front side of the core body 110 in the thickness direction, thereby forming a vacancy 122 in the thickness direction. With such disposition, a size occupied by the tab 120 in the longitudinal direction of the battery core 100 becomes thinner after the first connecting plate 351 is bent relative to the guide plate 353, so that the first connecting plate 351 can be disposed closer to the core body 110, and an overall size of the connection member 35 and the battery core 100 in the longitudinal direction is reduced, thereby increasing the energy density of the rechargeable battery.

In this embodiment, the position of the positive tab is consistent with that of the negative tab in the thickness direction.

As shown in FIG. 11 and FIG. 12, the tab 120 is arranged in the middle of the core body 110 in the height direction. As shown in FIG. 12, in the height direction of the battery core 100, a vacancy 121 is separately formed on the top and bottom of the tab 120. With such disposition, the tab 120 is easier to bend, so that the tab 120 is arranged between the first connecting plate 351 and the core body 110.

The connection member 35 is arranged at an end of the battery core 100 in the longitudinal direction. In this embodiment, one connection member 35 is disposed at each end of the battery core 100 in the longitudinal direction. One connection member 35 is connected to the positive tab of the battery core 100, and the other connection member is connected to the negative tab of the battery core 100. The connection member 35 connected to the positive tab of the battery core 100 is connected to the positive electrode component 31 on the top cover 30, and the connection member 35 connected to the negative tab of the battery core 100 is connected to the negative electrode component 34 on the top cover 30, so that the tab 120 can be electrically connected to the corresponding electrode component through the connection member 35.

In this embodiment, a manner of connecting the connection member 35 to the tab 120 of the corresponding end is the same for both ends of the battery core 100. Therefore, the following uses the connection member 35 at only one end of the battery core 100 in the longitudinal direction X and a connection relationship between the connection member 35 and the battery core 100 as an example for description.

As shown in FIG. 1 to FIG. 8, the connection member 35 includes two first connecting plates 351 that are respectively connected on two sides of the guide plate 353 in the width direction. The second connecting plate 352 is arranged above the battery core 100. Before the first connecting plate 351 is bent relative to the guide plate 353, an extension direction of the second connecting plate 352 is opposite to that of the first connecting plate 351. After assembly of the rechargeable battery is complete, the second connecting plate 352 is bent, relative to the guide plate 353, towards the side of the battery core 100 to be parallel to the end surface of the core body 100. In this embodiment, the second connecting plate 352 is electrically connected to the electrode component. In the embodiments not shown in the figures, the second connecting plate may alternatively be used as an electrode component of the rechargeable battery, with no need to specially dispose an electrode component.

As shown in FIG. 7 and FIG. 8, in this embodiment, the first connecting plate 351 after being bent is arranged on the inner side of the guide plate 353 in the width direction and parallel to the end surface of the core body 110, that is, perpendicular to the longitudinal direction X of the battery core 100.

In this embodiment, the connection member 35 is formed by a whole sheet material. During assembly of the connection member 35 and the battery core, after the position of the guide plate 353 relative to the battery core 100 is determined, the first connecting plate 351 is fastened to the tab 120 to be parallel to the longitudinal direction X of the battery core 100, and then the first connecting plate 351 is bent towards the inner side of the guide plate 353, to complete assembly of the connection member 35 and the battery core 100.

In some embodiments not shown in the figures, after the position of the guide plate 353 relative to the battery core 100 is determined, the first connecting plate 351 may alternatively be fastened to the tab 120 at an angle deviated away from the longitudinal direction X of the battery core 100, and then the first connecting plate 351 is bent towards the inner side of the guide plate 353, to complete the assembly of the connection member 35 and the battery core 100.

The first connecting plate 351 of the connection member 35 and the tab 120 of the battery core 100 may be electrically connected by ultrasonic welding, laser welding, or resistance welding, and also be fastened to some strength extent. After welding connection, the first connecting plate 351 of the connection member 35 is bent inwards, an internal space occupied by the connection member 35 and the battery core 100 in the longitudinal direction X is reduced, thereby increasing the energy density.

In this embodiment, the tab 120 of each of the two battery cores 100 is arranged on a side farther from the other battery core 100. In the embodiments not shown in the figures, the tab 120 of each of the two battery cores 100 may alternatively be arranged on a side closer to the other battery core 100.

The first connecting plate 351 is bent inwards relative to the guide plate 353, effectively reducing the space occupied by the connection member 35 at the end in the longitudinal direction X. Moreover, the tab 120 extends from a side in the width direction Y, effectively reducing a thickness of the tab 120 and further reducing a space occupied by a connection position between the connection member 35 and the tab 120. Therefore, the space utilization of the rechargeable battery and the energy density of the rechargeable battery are effectively improved. In addition, due to reduction of the overall thickness of the tab 120, a distance between the tab 120 and the connection member 35 in the longitudinal direction X can be set smaller, so that an active space of the tab 120 in the longitudinal direction X can be effectively reduced. The tab 120 is not prone to damage when the rechargeable battery is vibrated or shocked, and a probability of inserting the tab 120 into the core body 110 due to pressing is reduced. In this way, a risk of short circuits inside the rechargeable battery is reduced and a service life and safety performance of the battery core 100 are improved.

In addition, in this embodiment, as shown in FIG. 7 and FIG. 8, the rechargeable battery further includes a gasket 310 that is fastened to the first connecting plate 351 and the tab 120, and the tab 120 is sandwiched between the first connecting plate 351 and the gasket 310.

The gasket 310 is provided, to reduce direct shock on the tab 120 arranged on the side, of the connection member 35, farther from the core body 110 after the rechargeable battery is vibrated and shocked, to protect the tab 120 and improve the service life of the rechargeable battery.

Figure 14:
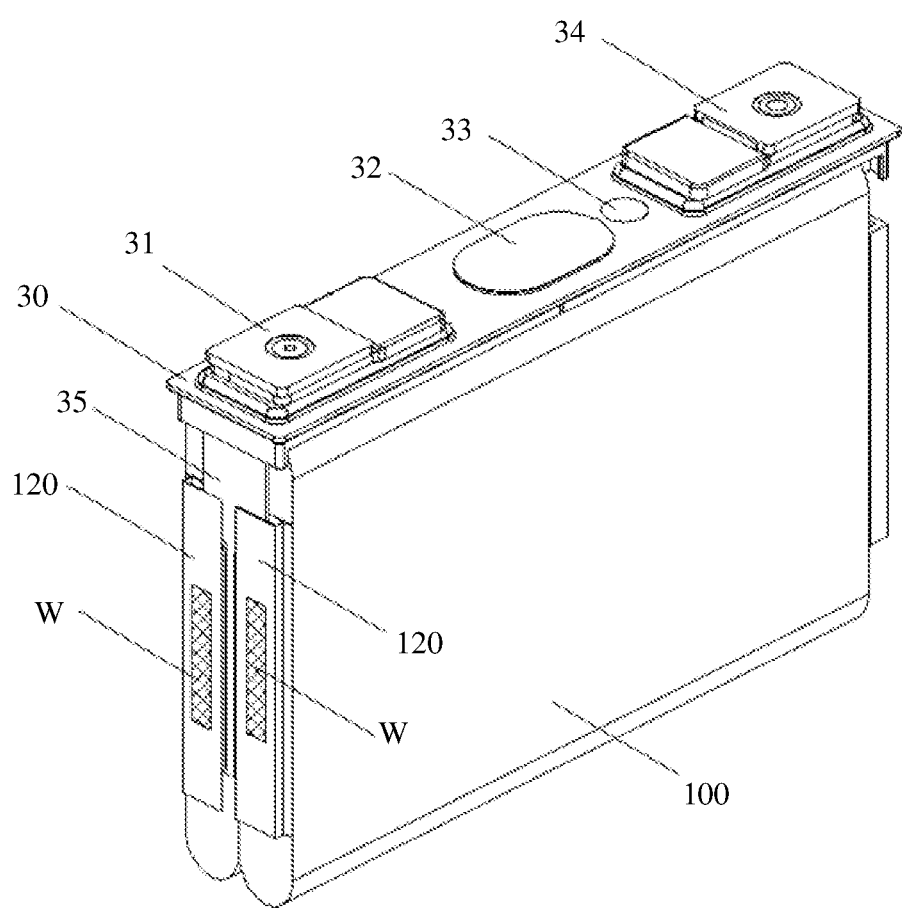
FIG. 14 is a schematic three-dimensional structural diagram of a rechargeable battery after a housing is disassembled according to an embodiment of this application.

In the embodiments shown in FIG. 14 and FIG. 15, in addition to the groove disposed in the connection member 35, a thickness of the first connecting plate 351 may be set to be smaller than a thickness of the guide plate 353, and the at least one indentation 35K is also provided. The portion, of the guide plate 353, connected to the first connecting plate 351 becomes gradually thinner in the direction from the guide plate 353 to the first connecting plate 351. The tabs 120 of the two battery cores 100 are respectively arranged on the sides farther from the other battery core 100. The tab 120 is fastened to the first connecting plate 351, and no gasket is disposed on the side, of the tab 120, opposite to the first connecting plate 351. The two first connecting plates 351 of the connection member 35 are bent towards the inner side of the guide plate 353.

Compared with a connection member having a same thickness as the guide plate 353 and the first connecting plate 351, the thickness of the first connecting plate 351 is less than the thickness of the guide plate 353, so that a space occupied in the rechargeable battery by the connection member 35 after bending can be further reduced, thereby further improving the energy density of the rechargeable battery. Moreover, because the thickness of the first connecting plate 351 decreases, welding and assembly quality of the first connecting plate 351 and the tab 120 of the rechargeable battery can be effectively improved. However, the thickness of the guide plate 353 remains relatively large, to reduce a resistance of the guide plate 353. In this way, an internal resistance of the rechargeable battery can meet a requirement, to ensure that the rechargeable battery does not heat abruptly when the rechargeable battery is charged or discharged at a large rate. In addition, the thickness of the first connecting plate 351 is smaller than that of the guide plate 353, conducive to bending of the first connecting plate 351. Therefore, this ensures a relative position of the connection member 35 and the battery core 100 after bending, facilitates assembly, and further helps reduce damage to the core body 110 or the tab 120 during bending.

In some embodiments not shown in the figures, the first connecting plate 351 may alternatively be bent outwards. In an implementation, at least a portion of the guide plate 353 protrudes, relative to the first connecting plate 351, towards the core body 110 to form a protrusion. In an implementation, the protrusion abuts against the battery core 100.

Figure 16:
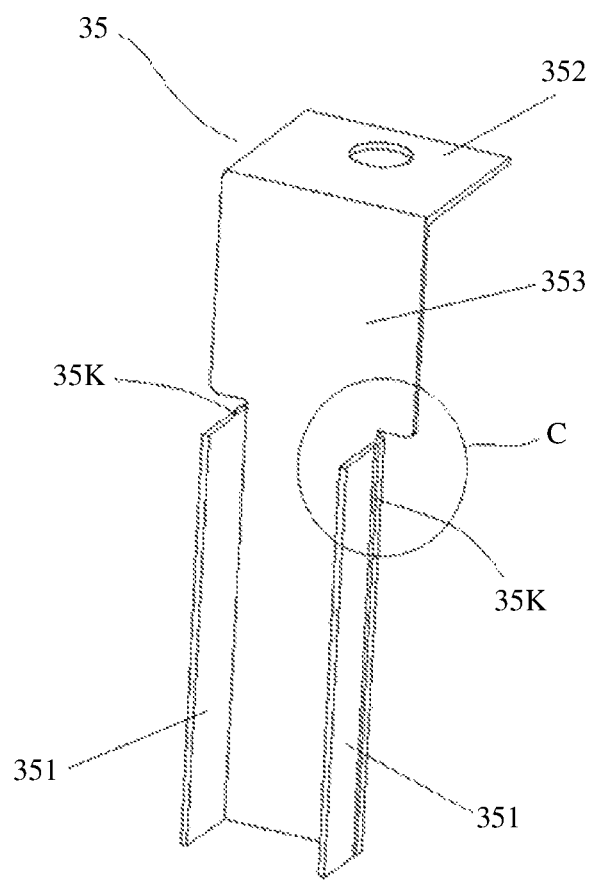
FIG. 16 is a schematic structural diagram of a connection member of a rechargeable battery before a first connecting plate is bent relative to a guide plate according to an embodiment of this application.
Figure 17:
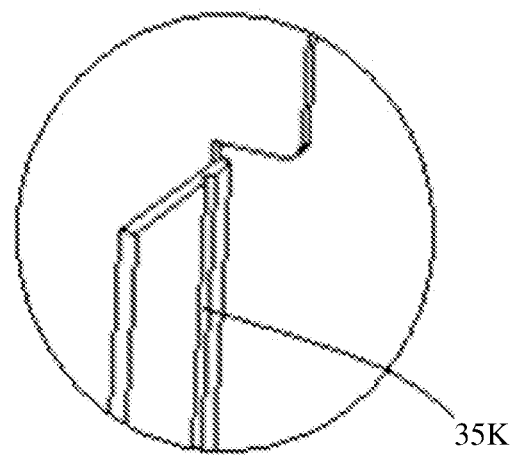
FIG. 17 is a schematic enlarged structural diagram of part C of FIG. 16.
Figure 18:
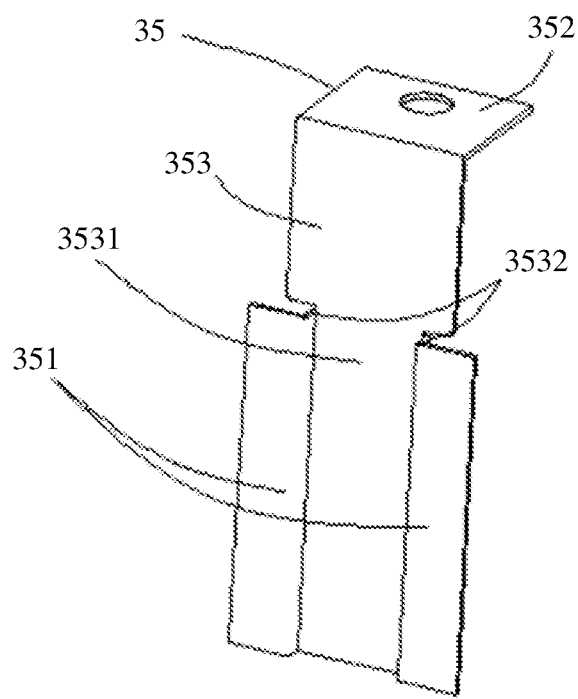
FIG. 18 is a schematic three-dimensional structural diagram of a connection member of a rechargeable battery shown in FIG. 16 after a first connecting plate is bent relative to a guide plate.

As shown in FIG. 16 to FIG. 18, in some embodiments, the connection member 35 includes the guide plate 353, two first connecting plates 351 connected to both side edges of the guide plate 353 in the width direction, and a second connecting plate 352 connected to the guide plate 353 and electrically connected to the outside of the rechargeable battery. The at least one indentation 35K is present between the first connecting plate 351 and the guide plate 353 that are of the connection member 35. Compared with the embodiments shown in FIG. 1 to FIG. 8, the first connecting plate 351 in this embodiment is bent towards the outer side of the guide plate 353.

As shown in FIG. 19 to FIG. 23, the rechargeable battery includes the housing, the top cover 30, the battery core 100, and the connection member 35. The top cover 30 is provided with the positive electrode component 31 configured to electrically connect to the positive electrode of the battery core 100, the negative electrode component 34 configured to electrically connect to the negative electrode of the battery core 100, and the explosion-proof valve 32.

In this embodiment, the tab 120 extends from a side of the core body 110 in the thickness direction (that is, the width direction Y). The first connecting plate 351 of the connection member 35 is connected to a side of the guide plate 353 in the width direction. The first connecting plate 351 is connected to the tab 120 and extends towards the outer side of the guide plate 353 in the width direction Y. The first connecting plate 351 is parallel to the end surface of the core body 110, in other words, the first connecting plate 351 is perpendicular to a longitudinal direction X of the battery core 100. At least a portion of the guide plate 353 protrudes, relative to the first connecting plate 351, towards a side of the core body 110 to form a protrusion, and the protrusion abuts against the battery core 100.

Because at least a portion of the guide plate 353 protrudes, relative to the first connecting plate 351, towards a side of the core body 110 to form a protrusion and the protrusion abuts against the battery core 100, when the rechargeable battery is vibrated or shocked, the protrusion of the guide plate 353 towards the side of the battery core 100 may come in contact with the battery core 100 to enable the connection member 35 to bear a force, thereby effectively alleviating a tab crack problem caused by vibration or shock on the tab 120. In addition, an active space of the tab 120 is reduced and a probability of inserting the tab 120 into the core body 110 due to pressing is reduced, thereby reducing a risk of short circuits inside the battery. Because both the probability of crack of the tab 120 and the probability of inserting the tab 120 into the core body 110 are reduced, the service life and safety performance of the battery core 100 can be improved.

As shown in FIG. 23, the guide plate 353 includes the main plate body 3531 and the flanged portion 3532. The flanged portion 3532 is arranged at a side edge of the main plate body 3531 in the width direction and extends along a direction away from the battery core 100. The first connecting plate 351 is connected to the guide plate 353 through the flanged portion 3532. The main plate body 3531 is a flat plate. The flanged portion 3532 is perpendicular to the main plate body 3531.

In other embodiments not shown in the figures, the flanged portion 3532 may alternatively be tilted towards the inner side of the main plate body 3531, or the flanged portion 3532 may be tilted towards the outer side of the main plate body 3531.

In this embodiment, the first connecting plate 351 is parallel to the main plate body 3531. In this case, both the first connecting plate 351 and the main plate 3531 are perpendicular to the longitudinal direction X.

In the embodiments not shown in the figures, the first connecting plate 351 and the main plate body 3531 may alternatively form an angle, for example, an outer end of the first connecting plate 351 in the width direction Y may be closer to the core body 110 than an inner end in the width direction Y.

In the embodiments shown in FIG. 19 to FIG. 23, the tab 120 of each of the two battery cores 100 may be arranged on a side farther from the other battery core 100.

In some exemplary embodiments, at least a portion of the guide plate 353 is attached to the battery core 100. In this embodiment, the guide plate 353 is entirely attached to a side of the core body 110. With such disposition, the tab 120 is less prone to damage and insertion into the core body 110 when the rechargeable battery is vibrated or shocked, further improving the service life and safety performance of the battery core 100.

In this embodiment, the main plate body 3531 of the connection member 35 is attached to the core body 110, to be specific, attached to an end surface of the separator at an end of the battery core 100 in the longitudinal direction X. The tab 120 barely plays fixing and positioning functions in the longitudinal direction X of the battery core 100, thereby more effectively protecting the tab 120 against damage. The main plate body 3531 of the connection member 35 is attached to the end surface of the separator of the battery core 100 to tightly compress the battery core 100, thereby playing a role of supporting, fastening, and positioning the battery core 100 along the longitudinal direction X. This prevents the battery core 100 from shaking inside the housing after the rechargeable battery is assembled.

The foregoing embodiments shall not constitute a limitation on this application.

For example, in the embodiments not shown in the figures, when the first connecting plate is bent outwards and the guide plate at least partially protrudes, relative to the first connecting plate, towards the core body, the tab of each of the two battery cores may alternatively be arranged on a side closer to the other battery core, to be specific, a position of extending the tab from the core body is arranged on the inner side of the rechargeable battery in the width direction Y. The main plate body of the guide plate abuts against a surface of the tab.

For another example, the first connecting plate may alternatively be connected to a set of battery cores. For example, the connection member may include two first connecting plates arranged on both sides in the width direction. Each first connecting plate is connected to a set of battery cores. The tab is disposed on a side of the core body in the thickness direction. The two sets of battery cores may each include two battery cores, and a tab of each of the two battery cores in one set is arranged on a side closer to the other battery core.

For the foregoing embodiments of this application, related technical content of other embodiments can be referred to or combined unless otherwise contradicted in the technical features.

Finally, it should be noted that the foregoing embodiments are merely intended for describing the technical solutions of this application, but not for limiting this application. Although this application is described in detail with reference to the exemplary embodiments, persons of ordinary skill in the art should understand that they may still make modifications to the embodiments or make equivalent replacements to some or all technical features thereof, without departing from the scope of the technical solutions of this application, which are all included in the scope of the technical solutions claimed by this application.

What is claimed is:

1. A rechargeable battery, comprising:
    a battery core; and
    a connection member comprising:
        a guide plate; and
        a first connecting plate integrally formed on the guide plate and connected to a tab of the battery core, wherein the first connecting plate is disposed in a bendable manner relative to the guide plate, and at least one indentation is present between the first connecting plate and the guide plate;
    wherein:
        the tab extends from a side of a core body of the battery core in a width direction; and
        at least a portion of the guide plate protrudes, relative to the first connecting plate, towards the core body of the battery core to form a protrusion, and the protrusion abuts against the battery core.

2. The rechargeable battery according to claim 1, wherein the connection member comprises the at least one indentation provided on a side, of the connection member, to which pressure is applied when the first connecting plate is bent relative to the guide plate.

3. The rechargeable battery according to claim 2, wherein all the indentations of the connection member are provided on the side, of the connection member, to which pressure is applied when the first connecting plate is bent relative to the guide plate.

4. The rechargeable battery according to claim 3, wherein the guide plate comprises a main plate body and a flanged portion, wherein the flanged portion is arranged at a side edge of the main plate body in a width direction, the first connecting plate is connected to the guide plate through the flanged portion, and a distance between the at least one indentation and the main plate body is 1 to 3 times a thickness of the main plate body.

5. The rechargeable battery according to claim 3, wherein a depth of the at least one indentation is ¼ to ⅓ of a minimum plate thickness at a position of the at least one indentation when the at least one indentation is not provided.

6. The rechargeable battery according to claim 2, wherein the guide plate comprises a main plate body and a flanged portion, wherein the flanged portion is arranged at a side edge of the main plate body in a width direction, the first connecting plate is connected to the guide plate through the flanged portion, and a distance between the at least one indentation and the main plate body is 1 to 3 times a thickness of the main plate body.

7. The rechargeable battery according to claim 2, wherein an opening of the at least one indentation is larger than a bottom of the at least one indentation before the first connecting plate is bent relative to the guide plate.

8. The rechargeable battery according to claim 2, wherein a depth of the at least one indentation is ¼ to ⅓ of a minimum plate thickness at a position of the at least one indentation when the at least one indentation is not provided.

9. The rechargeable battery according to claim 1, wherein the guide plate comprises a main plate body and a flanged portion, wherein the flanged portion is arranged at a side edge of the main plate body in a width direction, the first connecting plate is connected to the guide plate through the flanged portion, and a distance between the at least one indentation and the main plate body is 1 to 3 times a thickness of the main plate body.

10. The rechargeable battery according to claim 1, wherein a cross-section shape of the at least one indentation is one of a curve, a polygonal line and a combination of a curve and a straight line.

11. The rechargeable battery according to claim 1, wherein an opening of the at least one indentation is larger than a bottom of the at least one indentation before the first connecting plate is bent relative to the guide plate.

12. The rechargeable battery according to claim 1, wherein a depth of the at least one indentation is ¼ to ⅓ of a minimum plate thickness at a position of the at least one indentation when the at least one indentation is not provided.

13. The rechargeable battery according to claim 1, wherein the at least one indentation is provided continuously along a full or partial length of a bending position between the first connecting plate and the guide plate; or the at least one indentation comprises a plurality of indentation segments provided intermittently along the full or partial length of the bending position between the first connecting plate and the guide plate.

14. The rechargeable battery according to claim 1, wherein ends of a bending position between the first connecting plate and the guide plate comprise a first root and a second root that are respectively arranged at opposite ends of the bending position, the connection member comprises a first groove arranged at the first root and disposed on the first connecting plate and the guide plate, and the first groove is recessed downward from an upper edge of the bending position.

15. The rechargeable battery according to claim 14, wherein the connection member further comprises a second groove arranged at the second root and disposed on the first connecting plate and the guide plate, and the second groove is recessed upward from a lower edge of the bending position.

16. The rechargeable battery according to claim 1, wherein a thickness of the first connecting plate is set to be smaller than a thickness of the guide plate.

17. The rechargeable battery according to claim 1, wherein a portion, of the guide plate, connected to the first connecting plate becomes gradually thinner in a direction from the guide plate to the first connecting plate.

18. The rechargeable battery according to claim 1, wherein the rechargeable battery further comprises a gasket that is fastened to the first connecting plate and the tab, and the tab is sandwiched between the first connecting plate and the gasket.

19. The rechargeable battery according to claim 1, wherein the guide plate extends along the width direction, and the first connecting plate extends to an outer side of the guide plate along the width direction.

* * * * *